US011655316B2

(12) United States Patent
Lester et al.

(10) Patent No.: US 11,655,316 B2
(45) Date of Patent: May 23, 2023

(54) POLYMER FLOW INDEX MODIFIER

(71) Applicant: Univation Technologies, LLC, Houston, TX (US)

(72) Inventors: Charles D. Lester, S. Charleston, WV (US); Mark G. Goode, S. Charleston, WV (US); Timothy R. Lynn, Middlesex, NJ (US); Kevin J. Cann, Tierra Verde, FL (US); John H. Moorhouse, Middlesex, NJ (US); William Albert Matthews, Hilton Head Island, SC (US); Kefu Sun, Freeport, TX (US); Francois Alexandre, Saint-Leonard (CA)

(73) Assignee: Univation Technologies, LLC, Houston, TX (US)

( * ) Notice: Subject to any disclaimer, the term of this patent is extended or adjusted under 35 U.S.C. 154(b) by 254 days.

(21) Appl. No.: 17/123,310

(22) Filed: Dec. 16, 2020

(65) Prior Publication Data

US 2021/0102016 A1     Apr. 8, 2021

Related U.S. Application Data

(62) Division of application No. 16/094,555, filed as application No. PCT/US2017/027872 on Apr. 17, 2017, now Pat. No. 10,870,719.

(Continued)

(51) Int. Cl.
*C08F 2/38*     (2006.01)
*C08F 10/02*     (2006.01)
(Continued)

(52) U.S. Cl.
CPC .............. *C08F 210/02* (2013.01); *C08F 2/38* (2013.01); *C08F 4/69* (2013.01); *C08F 210/16* (2013.01);
(Continued)

(58) Field of Classification Search
None
See application file for complete search history.

(56) References Cited

U.S. PATENT DOCUMENTS 5,155,186 A    10/1992   Hogan et al.
5,608,019 A     3/1997   Cheruvu et al.
(Continued)

FOREIGN PATENT DOCUMENTS

GB        1379750       1/1975

OTHER PUBLICATIONS

International Search Report & Written Opinion for related PCT Application PCT/US2017/027872, dated Oct. 12, 2017 (10 pgs).

(Continued)

*Primary Examiner* — Vu A Nguyen
(74) *Attorney, Agent, or Firm* — Brooks, Cameron & Huebsch, PLLC

(57) ABSTRACT

Embodiments of the present disclosure are directed towards method for modifying a polymer flow index. As an example, a method for modifying a polymer flow index can include providing monomers to a polymerization reactor, providing a chromium catalyst to the polymerization reactor, and providing an active amount of a flow index modifier to the polymerization reactor, wherein the flow index modifier is selected from carbon dioxide, carbon monoxide, 2,4-hexadiene, and combinations thereof.

9 Claims, 4 Drawing Sheets

Related U.S. Application Data

(60) Provisional application No. 62/325,175, filed on Apr. 20, 2016.

(51) Int. Cl.

| | | |
|---|---|---|
| *C08F 210/02* | (2006.01) | |
| *C08F 2/34* | (2006.01) | |
| *C08F 4/69* | (2006.01) | |
| *C08F 210/16* | (2006.01) | |
| *C08K 3/00* | (2018.01) | |
| *C08K 5/01* | (2006.01) | |

(52) U.S. Cl.
CPC ............... *C08K 3/00* (2013.01); *C08K 5/01* (2013.01); *C08F 2/34* (2013.01); *C08F 2500/12* (2013.01)

(56) References Cited

U.S. PATENT DOCUMENTS

| | | | |
|---|---|---|---|
| 6,541,581 | B1 | 4/2003 | Follestad et al. |
| 6,586,544 | B2 | 7/2003 | Szul et al. |
| 7,067,598 | B2 * | 6/2006 | Kuhlburger ............ C08F 10/02 |
| | | | 526/901 |
| 9,944,727 | B2 | 4/2018 | Banat et al. |
| 2002/0040113 | A1 | 4/2002 | Fritzsche et al. |
| 2004/0030065 | A1 | 2/2004 | Kuhlburger et al. |
| 2006/0160965 | A1 | 7/2006 | Goode et al. |
| 2012/0041147 | A1 | 2/2012 | Lacombe et al. |
| 2012/0277386 | A1 | 11/2012 | Benham et al. |

OTHER PUBLICATIONS

International Preliminary Report on Patentability for related PCT Application PCT/US2017/027872, dated Nov. 1, 2018 (7 pgs).

\* cited by examiner

POLYMER FLOW INDEX MODIFIER

This application is a Divisional of application Ser. No. 16/094,555 filed on Oct. 18, 2018 and published as U.S. Publication No. 2019-0119416 A1 on Apr. 25, 2019, which is a National Stage Application under 35 U.S.C. § 371 of International Application Number PCT/US2017/027872, filed Apr. 17, 2017 and published as WO 2017/184483 on Oct. 26, 2017, which claims the benefit to U.S. Provisional Application 62/325,175, filed Apr. 20, 2016, the entire contents of which are incorporated herein by reference in its entirety.

FIELD OF DISCLOSURE

Embodiments of the present disclosure are directed towards modifying a polymer flow index, more specifically, embodiments are directed towards modifying a polymer flow index by utilizing a flow index modifier with a chromium catalyst.

BACKGROUND

Polymers may be utilized for a number of products including films and pipes, among other. Polymers can be formed by reacting one or more types of monomer in a polymerization reaction. There is continued focus in the industry on developing new and improved materials and/or methods that may be utilized to form polymers having one or more desirable properties.

SUMMARY

The present disclosure provides methods for modifying a polymer flow index, including: providing ethylene monomers to a polymerization reactor; providing a chromium catalyst to the polymerization reactor; and providing an active amount of a flow index modifier to the polymerization reactor.

The flow index modifier can be selected from carbon dioxide, carbon monoxide, 2,4-hexadiene, and combinations thereof.

The present disclosure provides that carbon dioxide may be utilized from 0.50 parts per million to 50.00 parts per million based upon the ethylene monomers.

The present disclosure provides that carbon monoxide may be utilized from 0.010 parts per million to 2.00 parts per million based upon the ethylene monomers.

The present disclosure provides that 2,4-hexadiene may be utilized from 0.05 parts per million to 5.00 parts per million based upon the ethylene monomers.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1:
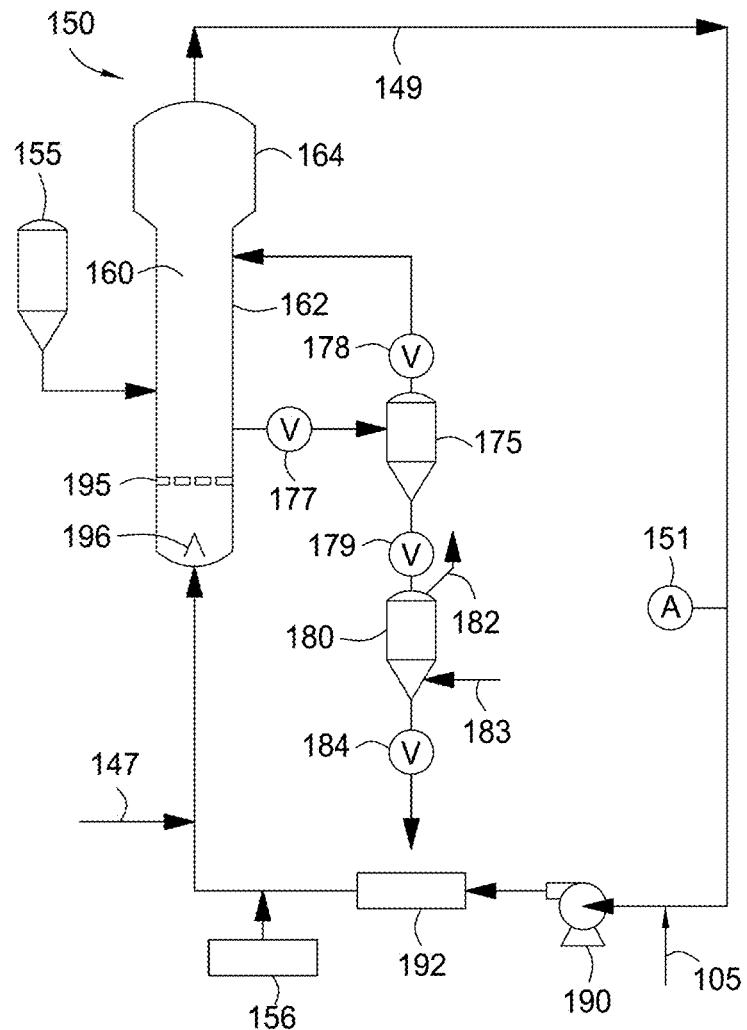
FIG. 1 illustrates an example of a portion of a polymerization system in accordance with one or more embodiments of the present disclosure.

Methods modifying a polymer flow index and polymers formed therefrom are described herein. As described herein, polymer flow index is a property that may affect the suitability of a polymer for particular applications. Polymer flow index, which may also be referred to as melt flow index, is a measure of melt flow of a polymer, e.g., a thermoplastic polymer. Polymer flow index can be utilized as an indirect measure of molecular weight. For instance, a greater polymer flow index associated with a particular polymer may indicate that the particular polymer has lower average molecular weight that another polymer associated with a relatively lesser polymer flow index. Because some polymers having a particular polymer flow index may not suitable for a number of particular applications, it may be desirable to modify the polymer flow index so that the polymers are suitable for number of particular applications, for example.

Embodiments of the present disclosure provide methods for modifying a polymer flow index. A method for modifying a polymer flow index can include providing ethylene monomers, e.g., an ethylene monomer feed, to a polymerization reactor; providing a chromium catalyst to the polymerization reactor; and providing a flow index modifier to the polymerization reactor, wherein the flow index modifier is selected from carbon dioxide, carbon monoxide, 2,4-hexadiene, and combinations thereof, for instance.

Surprisingly, it has been found that a polymer flow index may by modified, e.g., decreased or increased, by utilizing a flow index modifier with a chromium catalyst as discussed further herein. Embodiments of the present disclosure provide that the flow index modifier is selected from carbon dioxide, carbon monoxide, 2,4-hexadiene, and combinations thereof.

As mentioned, methods for modifying a polymer flow index and polymers formed therefrom are described herein. As used herein a "polymer" has two or more of the same or different polymer units derived from one or more different monomers, e.g., homopolymers, copolymers, terpolymers, etc. A "homopolymer" is a polymer having polymer units that are the same. A "copolymer" is a polymer having two or more polymer units that are different from each other. A "terpolymer" is a polymer having three polymer units that are different from each other. "Different" in reference to polymer units indicates that the polymer units differ from each other by at least one atom or are different isomerically.

Accordingly, the definition of copolymer, as used herein, includes terpolymers and the like.

Embodiments of the present disclosure provide that the polymer can be a polyolefin. As used herein an "olefin," which may be referred to as an "alkene," refers to a linear, branched, or cyclic compound including carbon and hydrogen and having at least one double bond. As used herein, when a polymer or copolymer is referred to as comprising, e.g., being formed from, an olefin, the olefin present in such polymer or copolymer is the polymerized form of the olefin. For example, when a copolymer is said to have an ethylene content of 75 wt % to 85 wt %, it is understood that the polymer unit in the copolymer is derived from ethylene in the polymerization reaction and the derived units are present at 75 wt % to 85 wt %, based upon the total weight of the polymer. A higher $\alpha$-olefin refers to an $\alpha$-olefin having 4 or more carbon atoms.

Polyolefins include polymers made from olefin monomers such as ethylene, i.e., polyethylene, and linear or branched higher alpha-olefin monomers containing 3 to about 20 carbon atoms. Examples of higher alpha-olefin monomers include, but are not limited to, propylene, 1-butene, 1-pentene, 1-hexene, 4-methyl-1-pentene, 1-octene, and 3,5,5-trimethyl-1-hexene. Examples of polyolefins include ethylene-based polymers, having at least 50 wt % ethylene, including ethylene-1-butene, ethylene-1-hexene, and ethylene-1-octene copolymers, among others. Other olefins that may be utilized include ethylenically unsaturated monomers, diolefins having 4 to 18 carbon atoms, conjugated or nonconjugated dienes, polyenes, vinyl monomers and cyclic olefins, for example. Examples of the monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In a number of embodiments, a copolymer of ethylene can be produced, where with ethylene, a comonomer having at least one alpha-olefin having from 4 to 15 carbon atoms, preferably from 4 to 12 carbon atoms, and most preferably from 4 to 8 carbon atoms, is polymerized, e.g., in a gas phase process. In another embodiment, ethylene and/or propylene can be polymerized with at least two different comonomers, optionally one of which may be a diene, to form a terpolymer.

Embodiments of the present disclosure provide that the polymers can have a density of from 0.920 to 0.970 g/cm$^3$. For example, the polymers can have a density of $\geq$0.920 g/cm$^3$, $\geq$0.930 g/cc, $\geq$0.935 g/cm$^3$, $\geq$0.940 g/cm$^3$, or $\geq$0.945 g/cm$^3$, and $\leq$0.970 g/cm$^3$, $\leq$0.960 g/cm$^3$, $\leq$0.950 g/cm$^3$, $\leq$0.935 g/cm$^3$, $\leq$0.930 g/cm$^3$, or $\leq$0.925 g/cm$^3$, or any combination of any high or low value recited herein. For instance, the polymers can have a density of 0.925 to 0.950 g/cm$^3$, 0.930 to 0.940 g/cm$^3$, 0.935 to 0.945 g/cm$^3$, and 0.935 to 0.950 g/cm$^3$, among others.

Generally, a relatively greater co-monomer content can result in a relatively lower density. Polyethylene copolymers herein can have a co-monomer content of $\geq$0 to 15 wt % based on a total weight of the polyethylene copolymer, e.g., 1.0 to 12.0 wt %, 2.0 to 10.0 wt %, 2.0 to 8.0 wt %, 2.0 to 7.0 wt %, 2.0 to 6.0 wt %, for example, where the polyethylene copolymers comprise co-monomer units derived from 1-butene and/or 1-hexene.

Embodiments of the present disclosure provide that the polymers can have a weight-averaged molecular weight (Mw)$\geq$about 100,000 g/mol, $\geq$about 150,000 g/mol$\geq$about 200,000 g/mol, $\geq$about 300,000 g/mol, $\geq$about 400,000 g/mol, $\geq$about 500,000 g/mol, $\geq$about 750,000 g/mol, or $\geq$about 1,000,000 g/mol. Additionally or alternatively, the Mw may be $\leq$about 1,000,000 g/mol, $\leq$about 750,000 g/mol, $\leq$about 1,000,000 g/mol, $\leq$about 500,000 g/mol, $\leq$about 400,000 g/mol, $\leq$about 300,000 g/mol, $\leq$about 200,000 g/mol, or $\leq$about 150,000 g/mol, or combinations of high or low values that provide ranges, as recited herein.

Embodiments of the present disclosure provide that the polymers can have a polymer flow index, e.g., a modified polymer flow index, of $\geq$about 0.01 g/10 min, $\geq$about 0.02 g/10 min, $\geq$about 0.10 g/10 min, $\geq$about 0.50 g/10 min, $\geq$about 0.75 g/10 min, $\geq$about 1.0 g/10 min, $\geq$about 2.0 g/10 min, $\geq$about 5.0 g/10 min, $\geq$about 10.0 g/10 min., or $\geq$about 25.0 g/10 min. Additionally or alternatively, the polymer flow index may be $\leq$about 50.0 g/10 min, e.g., $\leq$about 25.0 g/10 min, $\leq$about 10.0 g/10 min, $\leq$about 5.0 g/10 min, $\leq$about 2.0 g/10 min, $\leq$about 1.0 g/10 min, or $\leq$about 0.50 g/10 min. The polymer flow index may be in a range that includes a combination of any high and low values disclosed herein. For example, the polymers can have a polymer flow index in a range of about 0.01 to about 50.0 g/10 min, about 0.01 to about 25.0 g/10 min, about 0.01 to about 10.0 g/10 min, about 0.01 to about 5.0 g/10 min, about 0.01 to about 2.0 g/10 min, among others.

As mentioned, embodiments of the present disclosure provide methods for modifying a polymer flow index by utilizing a flow index modifier. The flow index modifier can be utilized to modify, e.g., change, a polymer flow index of polymer. For instance, a polymerization process can be utilized to form a polymer having a first polymer flow index; a flow index modifier may subsequently be added to the polymerization process to modify the polymer flow index to a second polymer flow index that is different than the first polymer flow index. Additionally or alternatively, a polymerization process, which includes a flow index modifier, can be utilized to form a polymer having a first polymer flow index, where the first polymer flow index is different than a second polymer flow index that would be realized by forming the polymer via the polymerization process without utilizing the flow index modifier.

Embodiments of the present disclosure provide that the flow index modifier is selected from carbon dioxide, carbon monoxide, 2,4-hexadiene, and combinations thereof.

A number of embodiments of the present disclosure provide that carbon dioxide may be utilized in an active amount as the flow index modifier. The carbon dioxide, i.e., the active amount, can be from 0.50 parts per million to 50.00 parts per million based upon ethylene monomers utilized to form the polymer, e.g., the ethylene monomer feed. All individual values and subranges from 0.50 parts per million to 50.00 parts per million are included; for example, the carbon dioxide can be from a lower limit of 0.50 parts per million, 1.00 parts per million, 2.50 parts per million, 5.00 parts per million, 10.00 parts per million, or 15.00 parts per million based upon the ethylene monomers to an upper limit of 50.00 parts per million, 45.00 parts per million, 40.00 parts per million, 37.50 parts per million, 35.00 parts per million, or 30.00 parts per million based upon the ethylene monomers. For one or more embodiments, the carbon dioxide can be about 25 parts per million based upon the ethylene monomer feed. As used herein, "parts per million" indicates parts per million volume (ppmv), unless indicated otherwise.

Utilizing a flow index modifier comprising carbon dioxide can provide, e.g., form, a polymer having a polymer flow index, e.g., a modified polymer flow index, which is reduced as compared to a second polymer having a different polymer flow index, where the second polymer is formed by the same polymerization process, but without utilizing an active amount of the flow index modifier. For instance, utilizing a flow index modifier comprising carbon dioxide can provide a polymer having a polymer flow index, e.g., the modified polymer flow index, that is reduced from about 5% to about 50% as compared to a second polymer having a different polymer flow index, where the second polymer is formed by the same polymerization process, but without utilizing an active amount of the flow index modifier. All individual values and subranges from about 5% to about 50% are included; for example, utilizing a flow index modifier comprising carbon dioxide can provide a polymer having a polymer flow index that is reduced from a lower limit of about 5%, about 7%, about 10%, or about 15% to an upper limit of about 50%, about 45%, about 40%, or about 35%, as compared to a second polymer having a different polymer flow index, where the second polymer is formed by the same polymerization process, but without utilizing an active amount of the flow index modifier. For one or more embodiments, utilizing a flow index modifier comprising carbon dioxide can provide a polymer having a polymer flow index that is reduced about 30%, as compared to a second polymer having a different polymer flow index, where the second polymer is formed by the same polymerization process, but without utilizing an active amount of the flow index modifier.

Utilizing a flow index modifier comprising carbon dioxide can provide a polymer having a density that is reduced as compared to a second polymer having a different density, where the second polymer is formed by the same polymerization process, but without utilizing an active amount of the flow index modifier. For instance, utilizing a flow index modifier comprising carbon dioxide can provide a polymer having a density that is reduced by about 0.0002 g/cm$^3$ to about 0.0040 g/cm$^3$ as compared to a second polymer having a different density, where the second polymer is formed by the same polymerization process, but without utilizing an active amount of the flow index modifier. All individual values and subranges from about 0.0002 g/cm$^3$ to 0.0040 g/cm$^3$ are included; for example, utilizing a flow index modifier comprising carbon dioxide can provide a polymer having a density that is reduced by a lower limit of about 0.0002 g/cm$^3$, 0.00025 g/cm$^3$, or 0.00028 g/cm$^3$ to an upper limit of about 0.0040 g/cm$^3$, 0.0035 g/cm$^3$, or 0.0032 g/cm$^3$.

Utilizing a flow index modifier comprising carbon dioxide can provide a polymer having a fluidized bulk density that is increased as compared to a second polymer having a different fluidized bulk density, where the second polymer is formed by the same polymerization process, but without utilizing an active amount of the flow index modifier. For instance, utilizing a flow index modifier comprising carbon dioxide can provide a polymer having a fluidized bulk density that is increased from about 0.5% to about 5.5% as compared to a second polymer having a different fluidized bulk density, where the second polymer is formed by the same polymerization process, but without utilizing an active amount of the flow index modifier. All individual values and subranges from about 0.5% to about 5.5% are included; for example, utilizing a flow index modifier comprising carbon dioxide can provide a polymer having a fluidized bulk density that is increased from a lower limit of about 0.5%, about 0.7%, about 1.0%, or about 1.5% to an upper limit of about 5.5%, about 5.0%, about 4.7%, or about 4.5%, as compared to a second polymer having a different fluidized bulk density, where the second polymer is formed by the same polymerization process, but without utilizing an active amount of the flow index modifier.

A number of embodiments of the present disclosure provide that carbon monoxide may be utilized in an active amount as the flow index modifier. The carbon monoxide, i.e., the active amount, can be from 0.010 parts per million to 2.000 parts per million based upon ethylene monomers utilized to form the polymer, e.g., the ethylene monomer feed. All individual values and subranges from 0.010 parts per million to 2.000 parts per million are included; for example, the carbon monoxide can from a lower limit of 0.010 parts per million, 0.015 parts per million, 0.0.020 parts per million, 0.025 parts per million, 0.030 parts per million, or 0.0.050 parts per million based upon the ethylene monomers to an upper limit of 2.00 parts per million, 1.750 parts per million, 1.500parts per million, 1.250 parts per million, 1.150 parts per million, or 1.000 parts per million based upon the ethylene monomers. For one or more embodiments, the carbon monoxide can be about 0.20 parts per million based upon the ethylene monomer feed. For one or more embodiments, the carbon monoxide can be about 0.50 parts per million based upon the ethylene monomer feed.

Utilizing a flow index modifier comprising carbon monoxide can provide a polymer having a polymer flow index, e.g., a modified polymer flow index, which is reduced as compared to a second polymer having a different polymer flow index, where the second polymer is formed by the same polymerization process, but without utilizing an active amount of the flow index modifier. For instance, utilizing a flow index modifier comprising carbon monoxide can provide a polymer having a polymer flow index, e.g., the modified polymer flow index, that is reduced from about 5% to about 50 as compared to a second polymer having a different polymer flow index, where the second polymer is formed by the same polymerization process, but without utilizing an active amount of the flow index modifier. All individual values and subranges from about 5% to about 50% are included; for example, utilizing a flow index modifier comprising carbon monoxide can provide a polymer having a polymer flow index that is reduced from a lower limit of about 5%, about 7%, about 10%, or about 15% to an upper limit of about 50%, about 45%, about 40%, or about 35%, as compared to a second polymer having a different polymer flow index, where the second polymer is formed by the same polymerization process, but without utilizing an active amount of the flow index modifier. For one or more embodiments, utilizing a flow index modifier comprising carbon monoxide can provide a polymer having a polymer flow index that is reduced about 30%, as compared to a second polymer having a different polymer flow index, where the second polymer is formed by the same polymerization process, but without utilizing an active amount of the flow index modifier.

Utilizing a flow index modifier comprising carbon monoxide can provide a polymer having a density that is reduced as compared to a second polymer having a different density, where the second polymer is formed by the same polymerization process, but without utilizing an active amount of the flow index modifier. For instance, utilizing a flow index modifier comprising carbon monoxide can provide a polymer having a density that is reduced by about 0.0002 g/cm$^3$ to about 0.0040 cm$^3$ as compared to a second polymer having a different density, where the second polymer is formed by the same polymerization process, but without utilizing an active amount of the flow index modifier. All individual values and subranges from about 0.0002 g/cm$^3$ to about 0.0040 g/cm$^3$ are included; for example, utilizing a flow index modifier comprising carbon monoxide can provide a polymer having a density that is reduced by a lower limit of about 0.0002 g/cm$^3$, 0.00022 g/cm$^3$, or 0.00024 g/cm$^3$ to an upper limit of about 0.0040 g/cm$^3$, 0.0035 g/cm$^3$, or 0.0032 g/cm$^3$.

Utilizing a flow index modifier comprising carbon monoxide can provide a polymer having a fluidized bulk density that is increased as compared to a second polymer having a different fluidized bulk density, where the second polymer is formed by the same polymerization process, but without utilizing an active amount of the flow index modifier. For instance, utilizing a flow index modifier comprising carbon monoxide can provide a polymer having a fluidized bulk density that is increased from about 2.0% to about 12.5% as compared to a second polymer having a different fluidized bulk density, where the second polymer is formed by the same polymerization process, but without utilizing an active amount of the flow index modifier. All individual values and subranges from about 2.0% to about 12.5% are included; for example, utilizing a flow index modifier comprising carbon monoxide can provide a polymer having a fluidized bulk density that is increased from a lower limit of about 2.0%, about 2.5%, about 3.0%, or about 3.5% to an upper limit of about 12.5%, about 12.0%, about 11.5%, or about 11.0%, as compared to a second polymer having a different fluidized bulk density, where the second polymer is formed by the same polymerization process, but without utilizing an active amount of the flow index modifier.

A number of embodiments of the present disclosure provide that 2,4-hexadiene may be utilized in an active amount as the flow index modifier. The 2,4-hexadiene, i.e., the active amount, can be from 0.05 parts per million to 5.00 parts per million based upon ethylene monomers utilized to form the polymer, e.g., the ethylene monomer feed. All individual values and subranges from 0.05 parts per million to 5.00 parts per million are included; for example, the 2,4-hexadiene can from a lower limit of 0.05 parts per million, 0.10 parts per million, or 0.50 parts per million based upon the ethylene monomers to an upper limit of 5.00 parts per million, 4.50 parts per million, or 4.00 parts per million based upon the ethylene monomers. For one or more embodiments, the 2,4-hexadiene can be about 0.70 parts per million based upon the ethylene monomer feed. For one or more embodiments, the 2,4-hexadiene can be about 2.78 parts per million based upon the ethylene monomer feed.

Utilizing a flow index modifier comprising 2,4-hexadiene can provide a polymer having a polymer flow index, e.g., a modified polymer flow index, which is increased as compared to a second polymer having a different polymer flow index, where the second polymer is formed by the same polymerization process, but without utilizing an active amount of the flow index modifier. For instance, utilizing a flow index modifier comprising 2,4-hexadiene can provide a polymer having a polymer flow index, e.g., the modified polymer flow index, that is increased from about 10% to about 75% as compared to a second polymer having a different polymer flow index, where the second polymer is formed by the same polymerization process, but without utilizing an active amount of the flow index modifier. All individual values and subranges from about 10% to about 75% are included; for example, utilizing a flow index modifier comprising 2,4-hexadiene can provide a polymer having a polymer flow index that is increased from a lower limit of about 10%, about 12%, or about 15 to an upper limit of about 75%, about 73%, or about 70%, as compared to a second polymer having a different polymer flow index, where the second polymer is formed by the same polymerization process, but without utilizing an active amount of the flow index modifier. For one or more embodiments, utilizing a flow index modifier comprising 2,4-hexadiene can provide a polymer having a polymer flow index that is increased about 50%, as compared to a second polymer having a different polymer flow index, where the second polymer is formed by the same polymerization process, but without utilizing an active amount of the flow index modifier.

Utilizing a flow index modifier comprising 2,4-hexadiene can provide a polymer having a density that is increased as compared to a second polymer having a different density, where the second polymer is formed by the same polymerization process, but without utilizing an active amount of the flow index modifier. For instance, utilizing a flow index modifier comprising 2,4-hexadiene can provide a polymer having a density that is increased from about 0.0005 g/cm$^3$ to about 0.0030 g/cm$^3$ as compared to a second polymer having a different density, where the second polymer is formed by the same polymerization process, but without utilizing an active amount of the flow index modifier. All individual values and subranges from about 0.0005 g/cm$^3$ to about 0.0030 g/cm$^3$ are included; for example, utilizing a flow index modifier comprising 2,4-hexadiene can provide a polymer having a density that is increased from a lower limit of about 0.0005 g/cm$^3$, 0.0007 g/cm$^3$, or 0.0010 g/cm$^3$ to an upper limit of about 0.0030 g/cm$^3$, 0.0027 g/cm$^3$, or 0.0025 g/cm$^3$.

Utilizing a flow index modifier comprising 2,4-hexadiene can provide a polymer having a fluidized bulk density that is decreased as compared to a second polymer having a different fluidized bulk density, where the second polymer is formed by the same polymerization process, but without utilizing an active amount of the flow index modifier. For instance, utilizing a flow index modifier comprising 2,4-hexadiene can provide a polymer having a fluidized bulk density that is decreased from about 5.0% to about 15.0% as compared to a second polymer having a different fluidized bulk density, where the second polymer is formed by the same polymerization process, but without utilizing an active amount of the flow index modifier. All individual values and subranges from about 5.0% to about 15.0% are included; for example, utilizing a flow index modifier comprising 2,4-hexadiene can provide a polymer having a fluidized bulk density that decreased from a lower limit of about 5.0%, about 6.0%, or about 7.0% to an upper limit of about 15.0%, about 14.0%, or about 13.0%, as compared to a second polymer having a different fluidized bulk density, where the second polymer is formed by the same polymerization process, but without utilizing an active amount of the flow index modifier.

Figure 2:
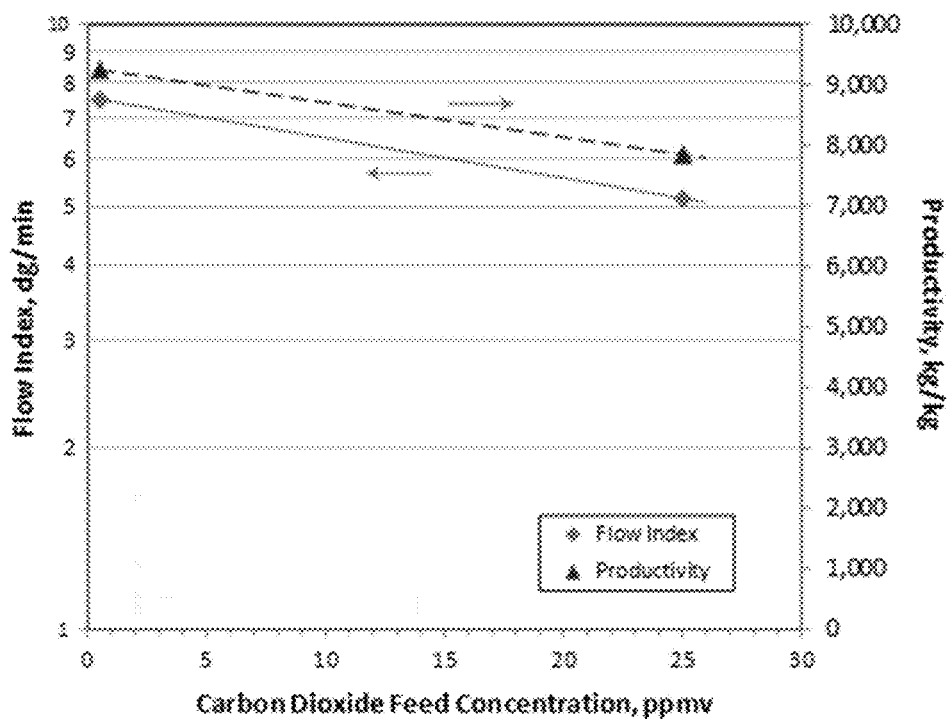
FIG. 2 illustrates polymer flow index and catalyst productivity for utilizing an active amount of flow index modifier with a chromium catalyst.
Figure 3:
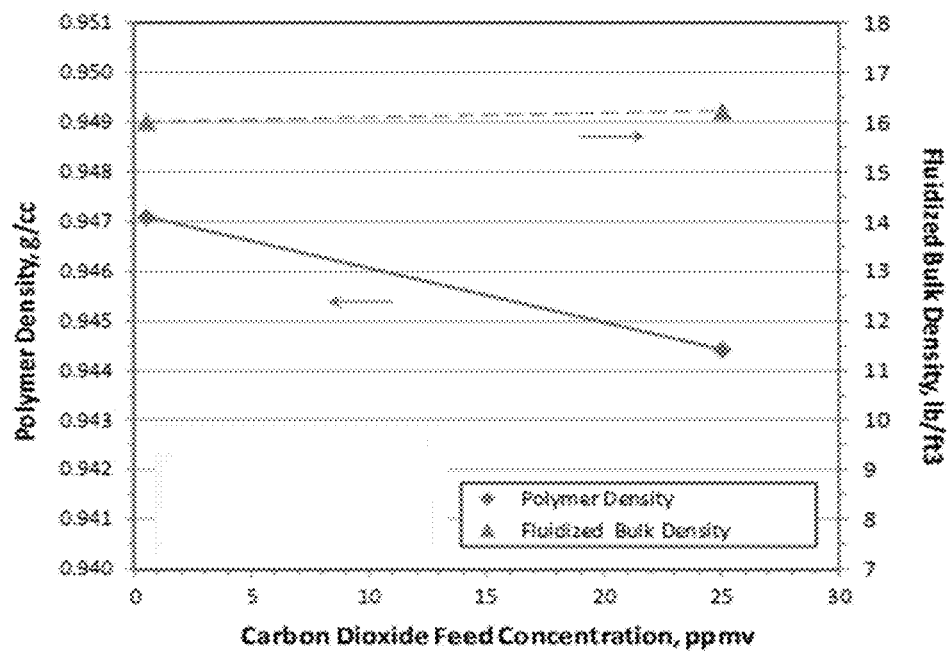
FIG. 3 illustrates polymer density and fluidized bulk density for utilizing an active amount of flow index modifier with a chromium catalyst.
Figure 4:
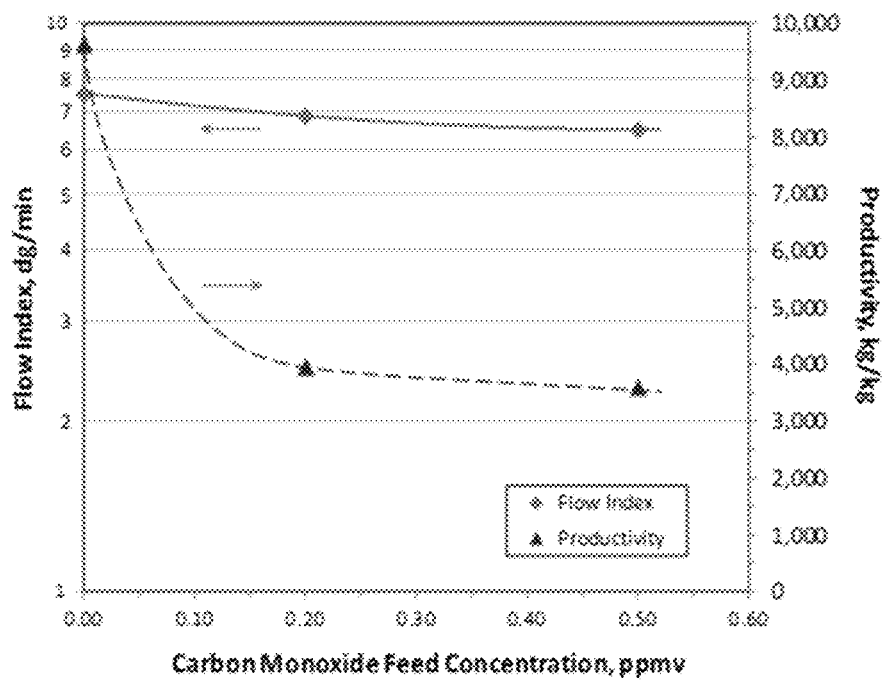
FIG. 4 illustrates polymer flow index and catalyst productivity for utilizing an active amount of flow index modifier with a chromium catalyst.
Figure 5:
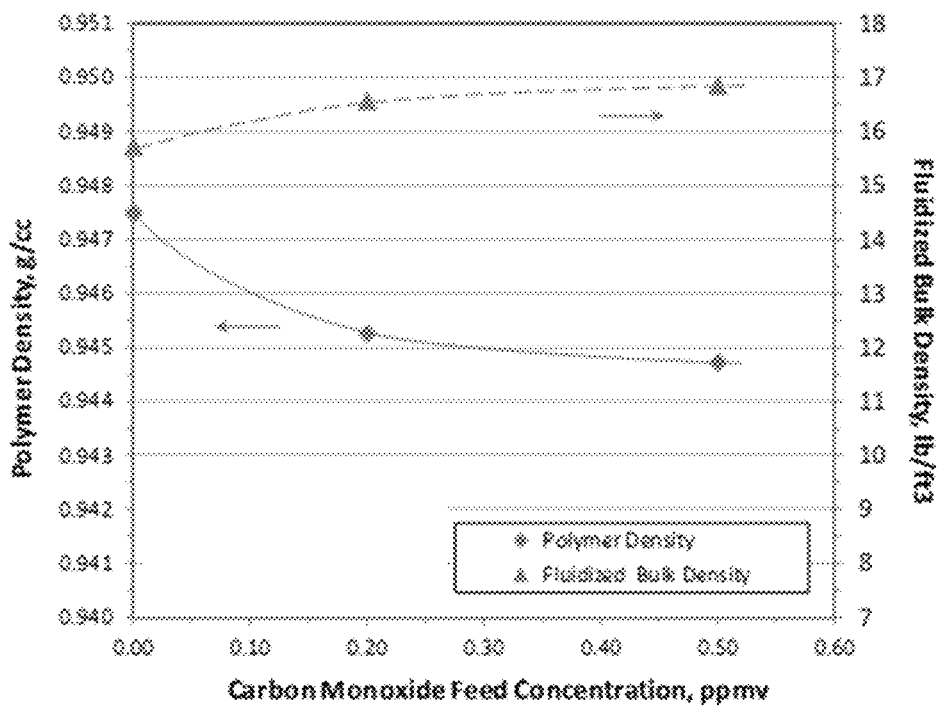
FIG. 5 illustrates polymer density and fluidized bulk density for utilizing an active amount of flow index modifier with a chromium catalyst.
Figure 6:
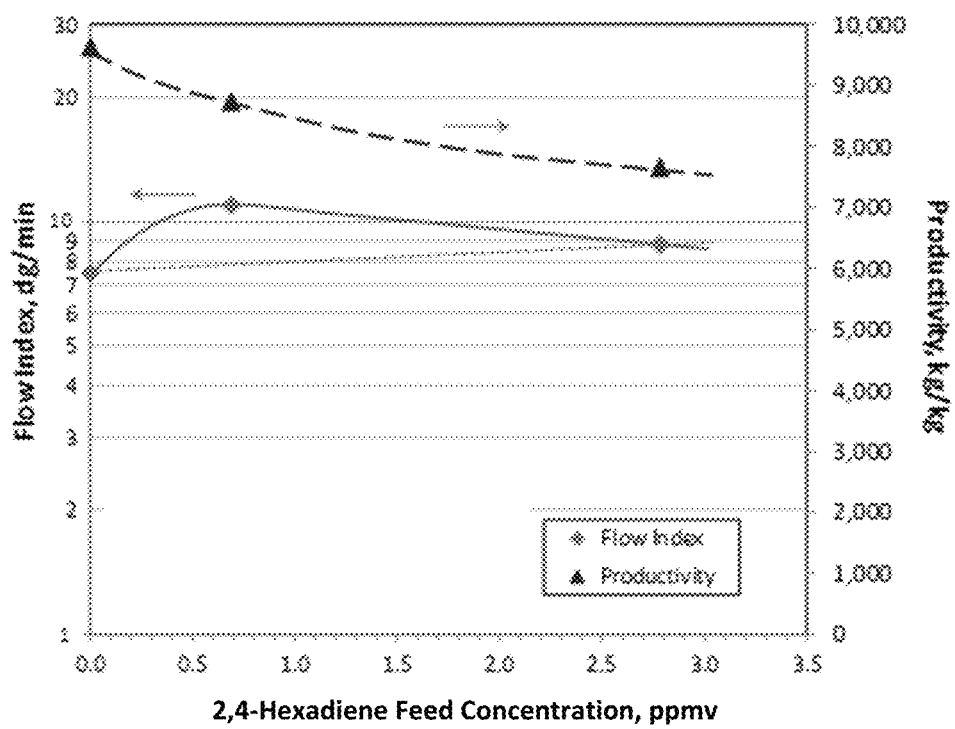
FIG. 6 illustrates polymer flow index and catalyst productivity for utilizing an active amount of flow index modifier with a chromium catalyst.
Figure 7:
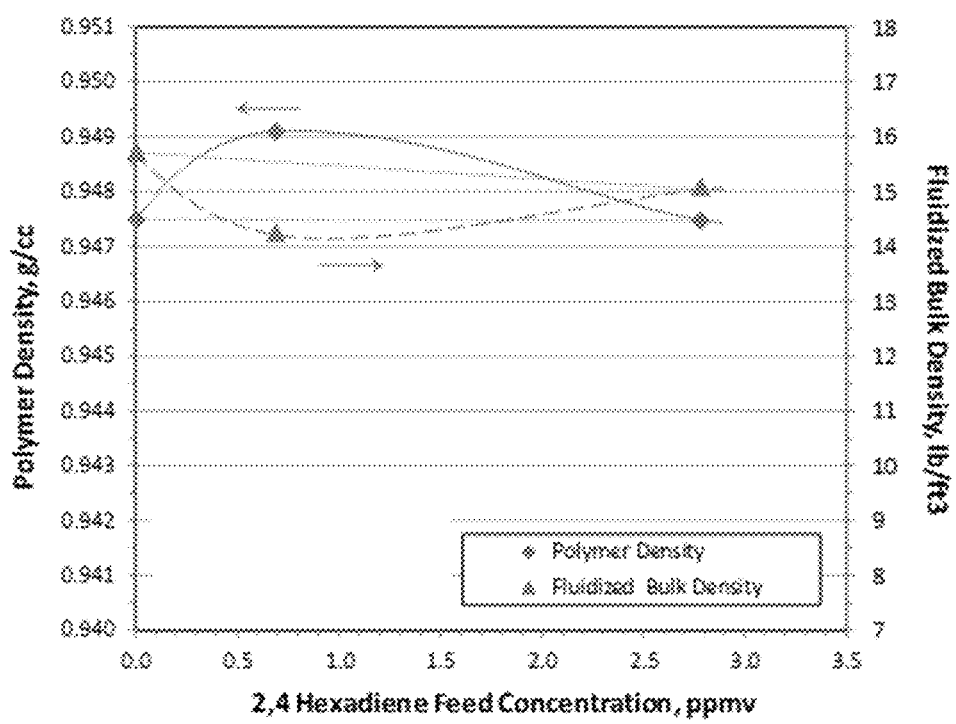
FIG. 7 illustrates polymer density and fluidized bulk density for utilizing an active amount of flow index modifier with a chromium catalyst.

FIG. 2 illustrates polymer flow index and catalyst productivity for utilizing an active amount of flow index modifier, i.e., carbon dioxide, with a chromium catalyst. FIG. 3 illustrates polymer density and fluidized bulk density for utilizing an active amount of flow index modifier, i.e., carbon dioxide, with a chromium catalyst. FIG. 4 illustrates polymer flow index and catalyst productivity for utilizing an active amount of flow index modifier, i.e., carbon monoxide, with a chromium catalyst. FIG. 5 illustrates polymer density and fluidized bulk density for utilizing an active amount of flow index modifier, i.e., carbon monoxide, with a chromium catalyst. FIG. 7 illustrates polymer flow index and catalyst productivity for utilizing an active amount of flow index modifier, i.e., 2,4-hexadiene, with a chromium catalyst. FIG. 7 illustrates polymer density and fluidized bulk density for utilizing an active amount of flow index modifier, i.e., 2,4-hexadiene, with a chromium catalyst. FIG. 6 and FIG. 7 illustrate that the polymer flow index and polymer density may pass through maximum values with increasing levels of 2,4-hexadiene; fluidized bulk density may pass through a minimum value; and catalyst productivity may decrease with increasing 2,4-hexadiene levels. As used herein, "maximum value" and "minimum value" each refer to respective extreme values associated with a respective trend line, e.g., the trend lines included in FIGS. 6 and 7, where the slopes of the respective trend lines are zero. FIG. 6 and FIG. 7 each include a respective dotted and straight line from the y-axis (i.e., where no carbon dioxide, carbon monoxide, or 2,4-hexadiene was utilized for the polymerization) to the greater concentration of 2,4-hexadiene utilized in the Examples, to illustrate changes as compared to the observed maxima and minima responses, which the lines do not pass directly through.

A number of embodiments of the present disclosure provide that one or more catalysts may be utilized in forming the polymers. The catalyst, which includes and may be referred to as a catalyst composition, may be a chromium catalyst. As used herein "chromium catalyst" refers to a catalyst that includes chromium. The catalyst may include a reducing agent. For a number of embodiments of the present disclosure, the chromium catalyst is a chromium oxide catalyst reduced with metal alkyl. In other words, a reduced chromium oxide catalyst may be utilized to form the polymer having the modified polymer flow index, as described herein. For initialization of the polymerization, e.g., for a pilot plant polymerization, a silyl chromate catalyst reduced with metal alkyl may be employed before transitioning to the reduced chromium oxide catalyst. The silyl chromate catalyst may be referred to as a startup catalyst. Alternatively, the reduced chromium oxide catalyst may be used to initiate polymerization with similar performance as the silyl chromate catalyst.

Chromium compounds may be used to prepare chromium oxide catalysts. Chromium compounds include $CrO_3$, as well as other compounds that are convertible to $CrO_3$, e.g., under activation conditions. Examples of compounds that are convertible to $CrO_3$ include chromic acetyl acetonate, chromic halide, chromic nitrate, chromic acetate, chromic sulfate, ammonium chromate, ammonium dichromate, or other soluble, chromium containing salts. Other examples of compounds that are convertible to $CrO_3$ include those discussed in U.S. Pat. Nos. 2,825,721, 3,023,203, 3,622,251, and 4,011,382, for instance. In a number of embodiments, chromic acetate may be utilized.

Silyl chromate compounds may be used to prepare the silyl chromate catalysts. Silyl chromate compounds include bis-triethylsilyl chromate, bis-tributylsilyl chromate, bis-triisopentylsilyl chromate, bis-tri-2-ethylhexylsilyl chromate, bis-tridecylsilyl chromate, bis-tri(tetradecyl)silyl chromate, bis-tribenzylsilyl chromate, bis-triphenylethylsilyl chromate, bis-triphenylsilyl chromate, bis-tritolylsilyl chromate, bis-trixylylsilyl chromate, bis-trinaphthylsilyl chromate, bis-triethylphenylsilyl chromate, bis-trimethylnaphthylsilyl chromate, polydiphenylsilyl chromate, and polydiethylsilyl chromate. Examples of such catalysts are discussed, for example, in U.S. Pat. Nos. 3,324,101, 3,704, 287, and 4,100,105, among others. In some embodiments, bis-triphenylsilyl chromate, bis-tritolylsilyl chromate, bis-trixylylsilyl chromate, and bis-trinaphthylsilyl chromate may be utilized. In other embodiments, bis-triphenylsilyl chromate may be utilized.

The silyl chromate compounds may be deposited onto conventional catalyst supports or bases, for example, inorganic oxide materials. The chromium compound used to produce a chromium oxide catalyst may be deposited onto conventional catalyst supports. The term "support," as used herein, refers to any support material, a porous support material in one exemplary embodiment, including inorganic or organic support materials. The supports may be inorganic oxides that include Group 2, 3, 4, 5, 13 and 14 oxides, and more particularly, inorganic oxides of Group 13 and 14 atoms. The Group element notation in this specification is as defined in the Periodic Table of Elements according to the IUPAC 1988 notation (IUPAC Nomenclature of Inorganic Chemistry 1960, Blackwell Publ., London). Therein, Groups 4, 5, 8, 9 and 15 correspond respectively to Groups IVB, VB, IIIA, IVA and VA of the Deming notation (Chemical Rubber Company's Handbook of Chemistry & Physics, 48th edition) and to Groups IVA, VA, IIIB, IVB and VB of the IUPAC 1970 notation (Kirk-Othmer Encyclopedia of Chemical Technology, 2nd edition, Vol. 8, p. 94). Non-limiting examples of supports include inorganic oxides such as silica, alumina, titania, zirconia, thoria, as well as mixtures of such oxides such as, for example, silica-chromium, silica-alumina, silica-titania, and the like.

Inorganic oxide materials, which may be used as a support in the catalyst compositions of the present disclosure, are porous materials having variable surface area and particle size. The support may have a surface area in a range of 50 to 1000 square meters per gram, and an average particle size of 20 to 300 micrometers. In one or more embodiments, the support may have a pore volume of about 0.5 to about 6.0 $cm^3/g$ and a surface area of about 200 to about 600 $m^2/g$. In one or more embodiments, the support may have a pore volume of about 1.1 to about 1.8 $cm^3/g$ and a surface area of about 245 to about 375 $m^2/g$. In one or more embodiments, the support may have a pore volume of about 2.4 to about 3.7 $cm^3/g$ and a surface area of about 410 to about 620 $m^2/g$. In one or more embodiments, the support may have a pore volume of about 0.9 to about 1.4 $cm^3/g$ and a surface area of about 390 to about 590 $m^2/g$. Each of the above properties may be measured using conventional techniques as known in the art.

The support may comprise silica, including amorphous silica, and high surface area amorphous silica. Such support materials are commercially available from a number of sources. Such sources include the W.R. Grace and Company which markets silica support materials under the trade names of Sylopol 952 or Sylopol 955, and PQ Corporation, which markets silica support materials under various trade designations, including ES70. The silica can be in the form of spherical particles, which are obtained by a spray-drying process, for example. Alternatively, PQ Corporation markets silica support materials under trade names such as MS3050 which are not spray-dried. As procured, these silicas are not calcined, i.e., not dehydrated. However, silica that is calcined prior to purchase may be used in catalysts of the present disclosure.

Supported chromium compounds, such as chromium acetate, which are commercially available, may also be used as a catalyst. Commercial sources include the W.R. Grace and Company, which provides chromium on silica support materials under trade names such as Sylopol 957, Sylopol 957HS, or Sylopol 957BG, and PQ Corporation, which provides chromium on silica support materials under various trade names, such as ES370. The chromium on silica support can be in the form of spherical particles, which are obtained by a spray-drying process. Alternatively, PQ Corporation provides chromium on silica support materials under trade names such as C35100MS and C35300MS, which are not spray-dried. As procured, these silicas are not activated.

However, if available, chromium supported on silica that is activated prior to purchase may be used in catalysts of the present disclosure.

Activation of a supported chromium oxide catalyst can be accomplished at various temperatures, e.g., from about 300° C. up to a temperature at which substantial sintering of the support takes place. For example, activated catalysts may be prepared in a fluidized-bed, as follows. The passage of a stream of dry air or oxygen through a supported chromium-based catalyst during the activation aids in the displacement of any water from the support and converts, at least partially, chromium species to Cr+6.

Temperatures used to activate the chromium oxide-based catalysts can be high enough for rearrangement of the chromium compound on the support material. Peak activation temperatures of from about 300° C. to about 900° C. for periods of from greater than 1 hour to as high as 48 hours can be utilized. The supported chromium oxide catalysts may be activated at temperatures from about 400° C. to about 850° C., from about 500° C. to about 700° C., or from about 550° C. to about 650° C. For one or more embodiments, the activation temperatures are about 600° C., about 700° C., or about 800° C. The supported chromium oxide catalysts may be activated at a chosen peak activation temperature for a period of from about 1 to about 36 hours, from about 3 to about 24 hours, or from about 4 to about 6 hours. For one or more embodiments, peak activation times are about 4 hours, or about 6 hours. Activation can be performed in an oxidative environment; for example, well dried air or oxygen can be used and the temperature can be maintained below the temperature at which substantial sintering of the support occurs. After the chromium compounds are activated, a powdery, free-flowing particulate chromium oxide catalyst is produced.

The cooled, activated chromium oxide catalyst may then be slurried and contacted with a reducing agent, fed at a selected feed rate over a selected time period, to result in a catalyst composition having a polymer flow index response within a selected range. The solvent may then be substantially removed from the slurry to result in a dried, free-flowing catalyst powder, which may be fed to a polymerization system as is or slurried in a suitable liquid prior to feeding.

In one or more embodiments, because organometallic components utilized in preparation of the catalysts described herein may react with water, the support material should preferably be substantially dry. For example, where the chromium-based catalysts are silyl chromates, the untreated supports may be dehydrated or calcined prior to contacting with the chromium-based catalysts.

The support may be calcined at elevated temperatures to remove water, and/or to effectuate a chemical change on the surface of the support. Calcination of the support can be performed using a procedure known to those of ordinary skill in the art.

For example, calcined silica may be prepared in a fluidized-bed, as follows. A silica support material, e.g. Sylopol 955, may be heated in steps or steadily from ambient temperature to the desired calcining temperature. e.g., 600° C., while passing dry nitrogen or dry air through or over the support material. The silica can be maintained at about this temperature for about 1 to about 4 hours, after which it is allowed to cool to ambient temperature. The calcination temperature may affect the number of OH groups on the support surface; i.e., the number of OH groups on the support surface (silanol groups in the case of silica) is approximately inversely proportional to the temperature of drying or dehydration: the higher the temperature, the lower the hydroxyl group content.

Supports may be calcined at a peak temperature from about 350° C. to about 850° C., from about 400° C. to about 700° C., or from about 500° C. to about 650° C. Calcination times may be from about 2 hours to about 24 hours, from about 4 hours to about 16 hours, from about 8 hours to about 12 hours.

The silyl chromate compound may be contacted with the calcined support to form a "bound catalyst." The silyl chromate compound may be contacted with the calcined support material in a procedure known to one of ordinary skill in the art. The silyl chromate compound may be contacted with the support as in a solution, slurry, or solid form, or some combination thereof, and may be heated to any desirable temperature, for a specified time sufficient to effectuate a desirable chemical/physical transformation.

This contacting and transformation can be conducted in a non-polar solvent. Suitable non-polar solvents may be materials which are liquid at contacting and transformation temperatures and in which some of the components used during the catalyst preparation, i.e., silyl chromate compounds and reducing agents are at least partially soluble. The non-polar solvents may be alkanes, particularly those containing about 5 to about 10 carbon atoms, such as pentane, isopentane, hexane, isohexane, n-heptane, isoheptane, octane, nonane, and decane. They may be cycloalkanes, particularly those containing about 5 to about 10 carbon atoms, such as cyclohexane and methylcyclohexane, may also be used. The non-polar solvent may also be a solvent mixture. The non-polar solvent may be purified prior to use, such as by degassing under vacuum and/or heat or by percolation through silica gel and/or molecular sieves, to remove traces of water, molecular oxygen, polar compounds, and other materials capable of adversely affecting catalyst activity. A reducing agent may then be contacted with the slurry, where the reducing agent is fed at a selected feed rate over a selected time period to result in a catalyst having a flow index response within a selected range. Alternatively, after supporting the silyl chromate compound on the support, and before adding the reducing agent, the solvent may then be substantially removed by evaporation, to yield a free-flowing supported silyl chromate on support. The thus supported silyl chromate may be re-slurried in the same or a different non-polar solvent and contacted with a reducing agent to result in a selected flow index response.

Once the catalyst is supported, and in the case of chromium oxide catalysts, activated, the chromium-based catalyst composition may then be slurried in a non-polar solvent, prior to the addition of the reducing agent. The supported catalyst may be chromium oxide supported catalysts, silyl chromate catalysts, or a mixture of both. This slurry is prepared by admixture of the supported catalyst with the non-polar solvent. In some embodiments, the supported silyl chromate compound is not dried before the addition of the reducing agent.

The chromium-based catalysts of the present disclosure can be contacted with a reducing agent. Reducing agents include organoaluminum compounds such as aluminum alkyls and alkyl aluminum alkoxides, for instance. Alkyl aluminum alkoxides, of the general formula $R_2AlOR$, may be suitable for use in embodiments of this disclosure. The R or alkyl groups of the above general formula may be the same or different, may have from about 1 to about 12 carbon atoms in some embodiments, about 1 to about 10 carbon atoms in other embodiments, about 2 to about 8 carbon atoms in yet other embodiments, and about 2 to about 4 carbon atoms in further embodiments. Examples of the alkyl aluminum alkoxides include, but are not limited to, diethylaluminum methoxide, diethylaluminum ethoxide (DEAlE), diethylaluminum propoxide, diethylaluminum iso-propoxide, diethylaluminum tert-butoxide, dimethylaluminum ethoxide, di-isopropyl aluminum ethoxide, di-isobutyl aluminum ethoxide, methyl ethyl aluminum ethoxide and mixtures thereof.

The reducing agent may be added to a mixture of a supported chromate catalyst with a non-polar solvent. The reducing agent may be added to a mixture of an activated chromium oxide catalyst with a non-polar solvent. The reducing agent may be added to a mixture of silyl chromate catalysts and activated chromium oxide-based catalyst in a non-polar solvent. When both chromium oxide-based catalysts and silyl chromate-based catalysts are utilized, each catalyst may be deposited on a separate support and have respective calcination and/or activation treatments prior to mixing together. Addition of the reducing agent to the catalyst slurry may be conducted at elevated temperatures and under an inert atmosphere, such as up to 7 bar (100 psig) nitrogen head pressure. For example, the slurry may be maintained at a temperature between about 30° C. and 80° C. during admixture of the reducing agent, at a temperature between about 40° C. and about 60° C., or at a temperature between about 40° C. and about 50° C.

Chromium-based catalysts formed by the described processes may have a chromium loading, e.g., on the support, ranging from about 0.15 to about 3 weight percent based on the total weight of the catalyst; from about 0.2 to about 0.3 weight percent; from about 0.4 to about 0.6 weight percent; or from 0.7 to about 1.2 weight percent. Chromium-based catalysts formed by the described processes may have a reducing agent to chromium molar ratio ranging from about 0.5 to about 8 in some embodiments; from about 2 to about 7 in other embodiments; and from about 3.0 to about 5.5 in yet other embodiments.

A number of embodiments of the present disclosure provide that chromium-based catalysts formed by the described processes may have an aluminum loading, e.g., on the support, ranging from about 0.15 to about 3 weight percent based on the total weight of the catalyst; from about 0.2 to about 0.3 weight percent; from about 0.4 to about 0.6 weight percent; or from 0.7 to about 2.0 weight percent. Chromium-based catalysts formed by the described processes may have a reducing agent to aluminum molar ratio ranging from about 0.5 to about 8 in some embodiments; from about 1 to about 7 in other embodiments; and from about 2.0 to about 5.5 in yet other embodiments.

A number of embodiments of the present disclosure provide that one or more additives may be utilized in forming the polymers. The polymers may include about 0.1 wt % to about 40 wt %, or 5 wt % to about 25 wt %, for example, of the one or more additives, based on a total weight of the resulting polymer. Examples of such additives include, but are not limited to, tackifiers, waxes, functionalized polymers such as acid modified polyolefins and/or anhydride modified polyolefins, antioxidants (e.g., hindered phenolics such as IRGANOX™ 1010 or IRGANOX™ 1076 available from Ciba-Geigy), (e.g., IRGAFOS™ 168 available from Ciba-Geigy), oils, compatabilizers, fillers, adjuvants, adhesion promoters, plasticizers, low molecular weight polymers, blocking agents, antiblocking agents, antistatic agents, release agents, anti-cling additives, colorants, dyes, pigments, processing aids, UV stabilizers, heat stabilizers, neutralizers, lubricants, surfactants, nucleating agents, flexibilizers, rubbers, optical brighteners, colorants, diluents, viscosity modifiers, oxidized polyolefins, and any combination thereof, among others.

The polymers may be formed by suspension, solution, slurry, and/or gas phase processes, using known equipment and reaction conditions. Polymer formation is not limited to any specific type of polymerization system. As an example, olefin polymerization temperatures may range from about 0° C. to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40° C. to about 300° C.

A number of embodiments of the present disclosure provide that the polymers may be formed via a gas phase polymerization system, at super-atmospheric pressures in the range from 0.07 to 68.9 bar (1 to 1000 psig), from 3.45 to 27.6 bar (50 to 400 psig), or from 6.89 to 24.1 bar (100 to 350 psig), and a temperature in the range from 30° C. to 130° C., from 65° C. to 110° C., from 75° C. to 120° C., or from 80° C. to 120° C. For a number of embodiments, operating temperatures may be less than 112° C. Stirred and/or fluidized bed gas phase polymerization systems may be utilized.

Generally, a conventional gas phase, fluidized bed process can be conducted by passing a stream containing one or more olefin monomers continuously through a fluidized bed reactor under reaction conditions and in the presence of a catalyst composition at a velocity sufficient to maintain a bed of solid particles in a suspended state. A stream comprising unreacted monomer can be continuously withdrawn from the reactor, compressed, cooled, optionally partially or fully condensed, and recycled back to the reactor. Product, i.e., polymer, can be withdrawn from the reactor and replacement monomer can be added to the recycle stream. Gases inert to the catalyst composition and reactants may also be present in the gas stream. The polymerization system may include a single reactor or two or more reactors in series, for example.

Feed streams may include olefin monomer, non-olefinic gas such as nitrogen and/or hydrogen, and may further include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the reactor at a single or multiple and different locations.

A number of embodiments of the present disclosure provide that oxygen may be added to the polymerization at a concentration relative to the ethylene feed rate to the reactor of about 10 to 600 parts per billion volume (ppbv), and more preferably about 10 to 500 ppbv. For instance, oxygen can be added at a concentration of 20 ppbv continuously to a reactor recirculation line at a point upstream of a cycle gas compressor, which is also upstream of a cycle gas heat exchanger, e.g., a cooler. This oxygen may help to reduce fouling of the cycle line, compressor and/or the heat exchanger with polymer.

Organometallic compounds may be employed as scavenging agents to remove catalyst poisons, thereby increasing the catalyst activity, or for other purposes. Examples of organometallic compounds that may be added include metal alkyls, such as aluminum alkyls. Conventional additives may also be used in the process.

An illustrative catalyst reservoir suitable for continuously feeding dry catalyst powder into the reactor is shown and described in U.S. Pat. No. 3,779,712, for example. A gas that is inert to the catalyst, such as nitrogen or argon, can be used to carry the catalyst into the reactor bed. In another embodiment, the catalyst can be provided as a slurry in mineral oil or liquid hydrocarbon or mixture such, as for example, propane, butane, isopentane, hexane, heptane or octane. An illustrative catalyst reservoir is shown and described in WO 2004/094489. The catalyst slurry may be delivered to the reactor with a carrier fluid, such as, for example, nitrogen or argon or a liquid such as for example isopentane or other $C_3$ to $C_8$ alkanes.

FIG. 1 illustrates an example of a portion of a polymerization system 150 in accordance with one or more embodiments of the present disclosure. The polymerization system 150 can include a reactor 160 in fluid communication with one or more discharge tanks 175 (only one shown), surge tanks 180 (only one shown), and recycle compressors 190 (only one shown). The polymerization system 150 can also include more than one reactor 160, e.g., arranged in series, parallel, or configured independently from the other reactors. Each reactor may have its own associated tanks 175, 180 and compressors 190 or alternatively, may share any one or more of the associated tanks 175, 180 and compressors 190. For simplicity and ease of description, embodiments of the present disclosure will be further described in the context of a single reactor train.

In one or more embodiments, the reactor 160 can include a reaction zone 162 in fluid communication with a velocity reduction zone 164. The reaction zone 162 can include a bed of growing polymer particles, formed polymer particles, and catalyst particles fluidized by the continuous flow of polymerizable and modifying gaseous components in the form of make-up feed and recycle fluid through the reaction zone 162.

A feedstream 105 can be directed to enter the cycle line before the compressor 190, but may also be located at any point in the polymerization system 150, including to the reactor fluid bed, the expanded section or to the cycle line before or after the cooler, e.g., as illustrated with alternative feedstream location 147. The term "feed stream" as used herein refers to a raw material, either gas phase or liquid phase, used in a polymerization process to produce a polymer product. For example, a feed stream may comprise a monomer as discussed herein. For instance, a feedstream may comprise an olefin monomer including substituted and unsubstituted alkenes having two to 12 carbon atoms, such as ethylene, propylene, 1-butene, 1-pentene, 4-methyl-1-pentene, 1-hexene, 1-octene, 1-decene, 1-dodecene, styrene, derivatives thereof, and combinations thereof. The feed stream may also include a non-olefinic gas such as nitrogen and hydrogen. Feed streams may enter the reactor at multiple and different locations. For example, monomers can be introduced into the polymerization zone in various ways including direct injection through a nozzle (not illustrated) into the bed. A feed stream may further include one or more non-reactive alkanes, e.g., that may be condensable in the polymerization process, for removing the heat of reaction. Non-reactive alkanes include, but are not limited to, propane, butane, isobutane, pentane, isopentane, hexane, isomers thereof, derivatives thereof, and combinations thereof.

For polymerization utilizing a chromium-based catalyst, including those modified with aluminum alkyls, hydrogen may be added at a gas mole ratio of hydrogen to ethylene in the reactor that can be in a range of about 0.0 to 0.5, in a range of 0.01 to 0.4, in a range of 0.03 to 0.3, or in a range of 0.005 to 0.020. A number of embodiments of the present disclosure utilize hydrogen gas. The hydrogen can affect the molecular weight and/or distribution of the polymer and may influence polymer properties.

During polymerization, the fluidized bed can have a general appearance of a dense mass of individually moving particles as created by the percolation of gas through the bed. A pressure drop through the bed can be equal to or slightly greater than a weight of the bed divided by a cross-sectional area. In other words, it can be dependent on the geometry of the reactor 160. To maintain a viable fluidized bed in the reaction zone 162, a superficial gas velocity through the bed can exceed a minimum flow velocity for fluidization. The superficial gas velocity can be at least two times the minimum flow velocity. For a number of embodiments, the superficial gas velocity does not exceed 5.0 ft/sec (1.52 m/sec). For a number of embodiments, the superficial gas velocity will be no more than 2.5 ft/sec (0.76 m/sec).

According to a number of embodiments, a height to diameter ratio of the reaction zone 162 can be in the range of from about 2:1 to about 5:1. The range may vary to larger or smaller ratios, e.g., depending upon a desired production capacity. A cross-sectional area of the velocity reduction zone 164 can be within the range of about 2 to about 3 multiplied by the cross-sectional area of the reaction zone 162, for example.

The velocity reduction zone 164 has a larger inner diameter than the reaction zone 162. As the name suggests, the velocity reduction zone 164 slows the velocity of the gas due to the increased cross sectional area. This reduction in gas velocity drops the entrained particles into the bed, allowing primarily only gas to flow from the reactor 160. That gas exiting the overhead of the reactor 160 is a recycle gas stream 149.

The recycle stream 149 can be compressed in a compressor 190 and then passed through a heat exchange zone where heat is removed before it is returned to the bed. The heat exchange zone can be a heat exchanger 192, which can be of the horizontal or vertical type, for example. Several heat exchangers can be employed to lower the temperature of the cycle gas stream in stages. It is also possible to locate the compressor downstream from the heat exchanger or at an intermediate point between several heat exchangers. After cooling, the recycle stream can be returned to the reactor 160. The cooled recycle stream can absorb the heat of reaction generated by the polymerization reaction.

The recycle stream can be returned to the reactor 160 and to the fluidized bed through a gas distributor plate 195. A gas deflector 196 can be installed at the inlet to the reactor 160, e.g., to reduce contained polymer particles from settling out and agglomerating into a solid mass and/or to reduce liquid accumulation at the bottom of the reactor, as well to facilitate easy transitions between processes which contain liquid in the cycle gas stream and those which do not and vice versa. An illustrative deflector suitable for this purpose is described in U.S. Pat. Nos. 4,933,149 and 6,627,713, for instance.

An activated precursor composition, with or without an aluminum alkyl modifier, which collectively can be referred to as catalyst, can be stored for service in a catalyst reservoir 155 under a blanket of a gas which is inert to the stored material, such as nitrogen or argon. The catalyst reservoir 155 can be equipped with a feeder suitable to continuously feed the catalyst into the reactor 160. An illustrative catalyst reservoir is shown and described in U.S. Pat. No. 3,779,712, for example. A gas that is inert to the catalyst, such as nitrogen or argon, can be used to carry the catalyst into the bed. The carrier gas can be the same as the blanket gas used for storing the catalysts in the catalyst reservoir 155. In one embodiment, the catalyst is a dry powder and the catalyst feeder comprises a rotating metering disk. In another embodiment, the catalyst is provided as a slurry in mineral oil or liquid hydrocarbon or mixture such as for example propane, butane, isopentane, hexane, heptane or octane. An illustrative catalyst reservoir is shown and described in WO 2004094489. The catalyst slurry may be delivered to the reactor with a carrier fluid, such as, for example, nitrogen or argon or a liquid such as for example isopentane or other $C_3$ to $C_8$ alkane.

The catalyst can be injected at a point into the bed where good mixing with polymer particles occurs, for example. For instance, the catalyst can be injected into the bed at a point above the distributor plate 195. Injecting the catalyst at a point above the distribution plate 195 can provide satisfactory operation of a fluidized-bed polymerization reactor, e.g., reactor 160. Injection of the catalyst into the area below the distributor plate 195 may cause polymerization to begin there and eventually cause plugging of the distributor plate 195. Injection directly into the fluidized bed can aid in distributing the catalyst uniformly throughout the bed and may help reduce the formation of localized spots of high catalyst concentration which can cause "hot spots" to form. Injection of the catalyst into the reactor 160 above the bed can result in excessive catalyst carryover into the recycle line 149, where polymerization could occur leading to plugging of the line 149 and/or heat exchanger 192.

A density modifier compound, e.g., an aluminum alkyl compound, non-limiting illustrative examples of which are triethyl aluminum and diethyl aluminum ethoxide, can be added to the reaction system 150 either directly into the fluidized bed or downstream of the heat exchanger 192, in which case the density modifier compound is fed into the recycle system from a dispenser 156. The amount of density modifier compound added to the polymerization reactor when using the chromium based catalyst can be in a range of about 0.005 to about 10 density modifier compound to chromium on a molar basis, in a range of about 0.01 to 5, in a range of about 0.03 to 3, or in a range of 0.05 to 2. Utilizing the density modifier compound may provide a fluidized bulk density and/or settled bulk density of the polymer that may be depressed by about 2 to 4 $lb/ft^3$.

The polymerization reaction can be conducted substantially in the absence of catalyst poisons such as moisture, oxygen, and acetylene. However, oxygen can be added back to the reactor 160 at very low concentrations to alter the polymer structure and its product performance characteristics. Oxygen may be added at a concentration relative to the ethylene feed rate to the reactor of about 10 to 600 ppbv, and more preferably about 10 to 500 ppbv.

A number of embodiments provide that co-monomers are polymerized with ethylene from about 0 to anywhere from 5, 10 or 20 weight percent of the co-monomer in the copolymer to achieve a desired density range of the copolymers. The amount of co-monomer can depend on the particular co-monomer(s) being utilized, the catalyst composition, the molar ratio of aluminum to chromium, catalyst preparation conditions, and/or reaction temperature. The ratio of the co-monomer to ethylene feed ratio and/or gas mole ratio can be controlled to obtain the desired resin density of copolymer product.

A gas analyzer 151 can be used to determine the composition of the recycle stream and the composition of the stream 105 and 147, and can be adjusted accordingly to maintain an essentially steady state gaseous composition within the reaction zone 162. The gas analyzer 151 can be a conventional gas analyzer that determines the recycle stream composition to maintain the ratios of feed stream components. Such equipment is commercially available from a wide variety of sources. The gas analyzer 151 may be positioned to receive gas from a sampling point located between the velocity reduction zone 164 and heat exchanger 192.

A rate of polymer production in the bed can depend on a rate of catalyst injection and a concentration of monomer(s) in the reaction zone. The production rate can be controlled by adjusting the rate of catalyst injection, for instance. Since a change in the rate of catalyst injection can change the reaction rate and thus the rate at which heat is generated in the bed, the temperature of the recycle stream entering the reactor can be adjusted to accommodate any change in the rate of heat generation. This help to provide an essentially constant temperature in the bed. Complete instrumentation of both the fluidized bed and the recycle stream cooling system is, of course, useful to detect any temperature change in the bed so as to enable either an operator or a conventional automatic control system to adjust the temperature of the recycle stream.

Under a given set of operating conditions, the fluidized bed is maintained at essentially a constant height by withdrawing a portion of the bed as product at the rate of formation of the polymer product. Since the rate of heat generation is directly related to the rate of product formation, a measurement of the temperature rise of the fluid across the reactor, e.g., a difference between inlet fluid temperature and exit fluid temperature, is indicative of the rate of polymer formation at a constant fluid velocity if no or negligible vaporizable liquid is present in the inlet fluid, for instance.

According to a number of embodiments, on discharge of polymer product from the reactor 160, it can be preferable to separate fluid from the product and to return the fluid to the recycle line 149. There are a number of ways known to the art to accomplish this separation. In one or more embodiments, fluid and product leave the reactor 160 and enter the product discharge tanks 175 (one is illustrated) through valve 177, which may be a ball valve designed to have minimum restriction to flow when opened. Positioned above and below the product discharge tank 175 are conventional valves 178, 179. The valve 179 allows passage of product into the product surge tanks 180 (one is illustrated).

In one or more modes of operation, valve 177 is open and valves 178,179 are in a closed position. Product and fluid enter the product discharge tank 175. Valve 177 closes and the product is allowed to settle in the product discharge tank 175. Valve 178 is then opened permitting fluid to flow from the product discharge tank 175 to the reactor 162. Valve 178 is then closed and valve 179 is opened and any product in the product discharge tank 175 flows into the product surge tank 180. Valve 179 is then closed. Product is then discharged from the product surge tank 180 through valve 184. The product can be further purged to remove residual hydrocarbons and conveyed to storage or compounding. The particular timing sequence of the valves 177, 178, 179, 184 is accomplished by the use of conventional programmable controllers which are well known in the art.

Another example of a product discharge system, which may be alternatively employed, is disclosed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor 160 can be equipped with a venting system (not illustrated) to provide venting of the bed during start up and shut down. The reactor 160 does not require the use of stirring and/or wall scraping. The recycle line 149 and the elements therein, e.g., compressor 190 and heat exchanger 192, etc., can be smooth surfaced and devoid of unnecessary obstructions so as not to impede the flow of recycle fluid or entrained particles.

Various techniques for preventing fouling of the reactor and polymer agglomeration can be used. Illustrative of these techniques are the introduction of finely divided particulate matter to prevent agglomeration, as described in U.S. Pat. Nos. 4,994,534 and 5,200,477; the addition of negative charge generating chemicals to balance positive voltages or the addition of positive charge generating chemicals to neutralize negative voltage potentials as described in U.S. Pat. No. 4,803,251, for instance. Antistatic substances may also be added, either continuously or intermittently to prevent or neutralize electrostatic charge generation. Condensing mode operation such as disclosed in U.S. Pat. Nos. 4,543,399 and 4,588,790 can also be used to assist in heat removal from the fluid bed polymerization reactor.

The conditions for polymerizations vary depending upon the monomers, catalysts and equipment availability. The specific conditions are known or readily derivable by those skilled in the art. For example, the temperatures may be in the range from 30° C. to 130° C., from 65° C. to 110° C., from 75° C. to 120° C., or from 80° C. to 120° C. For one or more embodiments, operating temperatures may be less than 112° C. A number of embodiments of this disclosure provide gas phase polymerization systems, at super-atmospheric pressures in the range from 0.07 to 68.9 bar (1 to 1000 psig), from 3.45 to 27.6 bar (50 to 400 psig), or from 6.89 to 24.1 bar (100 to 350 psig). Additional known details of polymerization are described in U.S. Pat. No. 6,627,713, which is incorporated by reference.

EXAMPLES

In the Examples, various terms and designations for materials are used including, for instance, the following:

Carbon dioxide (flow index modifier, 10,000 ppm in nitrogen, available from Airgas, Inc.); carbon monoxide (flow index modifier, 5,000 ppm in nitrogen, available from Airgas, Inc.); 2,4-hexadiene (flow index modifier, diluted in hexane, 90% technical grade, CAS 592-46-1, available from Sigma-Aldrich); alkyl aluminum alkoxide (DEAlE in isopentane, available from Akzo Nobel).

Silyl chromate catalysts (startup catalyst) were prepared as follows. Porous silica support (Grade Sylopol 955 silica produced by Davison Catalyst division of W. R. Grace and Co; particle size approximately 40 microns; surface area of approximately 300 square meters per gram) was charged to a fluidized bed heating vessel and heated at a rate of approximately 100° C. per hour under dry nitrogen to approximately 325° C. The nitrogen stream was then replaced with a stream of dry air and the support was heated at a rate of about 100° C. per hour to approximately 600° C., where it was maintained for approximately 1.5 to 4 hours. Thereafter, the support was cooled with dry, ambient temperature air to approximately 300° C. and then further cooled to room temperature with dry, ambient temperature nitrogen to provide a powder, which was stored under nitrogen atmosphere until further processing.

The support, as described above, was placed in a vertical catalyst blender with a double helical ribbon agitator under an inert atmosphere. Approximately 5.8 liters of degassed and dried hexane solvent were charged per kilogram (0.70 gallons per pound) of silica. The resulting mixture was stirred and heated to approximately 45° C. Thereafter, 3.15 kilograms of bis(triphenylsilyl) chromate powder was charged for every 100 kilograms of silica; then stirred for 10 hours while maintained at about 45° C. to provide a slurry. Thereafter, a 25 wt % solution of DEAlE in isopentane was added above the surface of the slurry in less than 10 minutes to provide a selected molar ratio of DEAlE/Cr. The mixture was agitated at 30 rpm at a temperature of approximately 45° C. during the addition time and thereafter for approximately 2 hours. Thereafter, the solvent was substantially removed by drying at a jacket temperature of approximately 60° C. for about 18 to 24 hours at slightly above atmospheric pressure to provide the silyl chromate catalysts. The silyl chromate catalyst (a dry, free flowing powder) was then stored under nitrogen until used.

Reduced chromium oxide catalysts were prepared as follows. Porous silica support containing approximately 5 wt % chromium acetate (Grade C35300MSF chromium on silica; particle size of approximately 82 microns; surface area of approximately 500 square meters per gram; produced by PQ Corporation) to provide approximately 1 wt % Cr, was charged to a fluidized bed heating vessel. Therein, the chromium on silica was heated at a rate of approximately 50° C. per hour under dry nitrogen up to 200° C. and maintained at that temperature for approximately 4 hours. Thereafter, the chromium on silica was heated at a rate of approximately 50° C. per hour under dry nitrogen up to 450° C. and maintained at that temperature for approximately 2 hours. The nitrogen stream was then replaced with a stream of dry air and the chromium on silica was heated at a rate of approximately 50° C. per hour to 600° C., where it was maintained for about 6 hours for activation. The activated chromium on silica was then cooled with ambient temperature dry air to approximately 300° C. and then further cooled to room temperature with dry, ambient temperature nitrogen. The activated chromium on silica was placed in a vertical catalyst blender with a double helical ribbon agitator under an inert atmosphere. Dried isopentane solvent was added to the vertical catalyst blender to provide a slurry. Thereafter, a 25 wt % solution of DEAlE in isopentane was added above the surface of the slurry over an approximate 40 to 60-minute time period to provide a selected aluminum loading weight percent. The slurry was agitated at 30 rpm at a temperature of approximately 45° C. during the addition time and thereafter for approximately 2 hours. Thereafter, solvent was substantially removed by drying at a jacket temperature approximately 60° C. to 70° C. for about 18 to 21 hours at slightly above atmospheric pressure to provide the reduced chromium oxide catalysts. The reduced chromium oxide catalyst (a dry, free flowing powder) was then stored under nitrogen until used.

Comparative Example A was performed as follows. A 60 kg silyl chromate catalystpolymerized seed bed was loaded to a UNIPOL™ pilot plant gas phase fluid bed reactor. The reactor comprised a vertical cylinder with a nominal pipe size of about 14 inches, followed by a freeboard, diameter transition spool piece and an expanded section. In operation, fluidizing gas was circulated in a continuous loop entering the fluidized bed from below through a distributor plate, passing through the bed and out the top of the reactor to a cycle gas compressor (blower) and then through a shell and tube cooler to control the bed polymerization temperature. Superficial gas velocity was calculated continuously through the bed and maintained with a ball valve and venturi assembly in the cycle line. Concentration of monomers and reactive/non-reactive gases was monitored by a chromatograph that sampled the gas every 1 to 5 minutes. Ethylene partial pressure was measured and controlled by a DCS (Distributed Control System), as were the hydrogen and any comonomer levels that were converted to gas mole ratio to ethylene partial pressure for controlling the polymer flow index and the polymer density. Total reactor pressure was essentially constant and controlled with make-up nitrogen or by additional venting. Polymer was discharged periodically from the reactor through a first valve to a receiving tank where it was purged with nitrogen to reduce the concentration of monomers before being released through a second valve to a fiber-pak drum exposed to the atmosphere.

The reactor and seed bed were dried to less than 2 ppm water at high temperature, followed by a passivation period with a dilute solution of trimethylaluminum (TMA) at high temperature to remove trace water and other impurities. Thereafter, a series of nitrogen purge cycles were performed, followed by the addition of a low level of carbon dioxide at high temperature to react with residual TMA. Gas compositions and temperature for polymerization were then established in the reactor and the catalyst feed initiated. Dilute triethylaluminum in isopentane was then fed to the reactor for approximately 48 hours to sustain the silyl chromate catalyst reaction as impurities were removed. Thereafter, the reactor was maintained at a temperature of 110° C. for 6 days. This reactor startup was longer than expected, e.g., a polymerization reaction can generally be started after the inside of the reactor has been exposed to air (during a reactor shut-down), that does not utilize TEAl and/or a protracted period of time of higher temperature operation to remove impurities, as described for Comparative Example A. Then, the reactor was transitioned to the reduced chromium oxide catalysts and the following reactor conditions were maintained: reactor temperature of 108° C., $H_2/C_2$ gas mole ratio of 0.15, $C_6/C_2$ gas mole ratio of 0.036, and an average residence time of the bed in the reactor of 2.3 hours. The bed weight was adjusted to maintain the bed level in the reactor between 8-9 feet and an anti-fouling stream of dilute oxygen in nitrogen (oxygen add-back) was maintained at 0.020 ppm on an ethylene feed basis to the cycle line before the cycle gas compressor, which was upstream of the cycle gas shell and tube heat exchanger (water on the shell side) for the bed temperature control. For some polymerizations, oxygen may provide a flow index increase with increasing oxygen concentrations; however, oxygen was utilized for each Example and Comparative Example herein. FIGS. 4 through 7 respectively illustrate polymer flow index, catalyst productivity, polymer density, and fluidized bulk density for Comparative Example A (0.020 ppm oxygen polymerization, i.e. at 0.0 ppm of the polymer flow index modifier described herein).

Comparative Example B was performed as Comparative Example A with the change that carbon dioxide was utilized at a reactor concentration of 0.20 ppm carbon dioxide based upon ethylene feed, a concentration less than the active amount described herein, and introduced via a pressurized cylinder of the carbon dioxide diluted in nitrogen that was metered to the reactor through a low flow rate Brooks Instrument 5850E Mass Flow Controller. Flow index additive concentration was adjusted relative to the reactor ethylene feed rate on a molar basis.

Example 1, a process for modifying a polymer flow index, was performed as Comparative Example B with the change that the carbon dioxide was utilized at a reactor concentration of 25.0 ppm carbon dioxide based upon the ethylene feed.

Example 2, a process for modifying a polymer flow index, was performed as Comparative Example B with the change that carbon monoxide at a reactor concentration of 0.20 ppm carbon monoxide based upon the ethylene feed was utilized rather than the carbon dioxide diluted in nitrogen.

Example 3, a process for modifying a polymer flow index, was performed as Comparative Example B with the change that the carbon monoxide was utilized at a reactor concentration of 0.51 ppm carbon monoxide based upon the ethylene feed rather than the carbon dioxide diluted in nitrogen.

Example 4, a process for modifying a polymer flow index, was performed as Comparative Example B with the change that 2,4-hexadiene diluted in hexane was utilized rather than the carbon dioxide diluted in nitrogen. The 2,4-hexadiene diluted in hexane was utilized at a reactor concentration of 0.69 ppm 2,4-hexadiene based upon the ethylene feed and was added directly to the reactor via a ⅛ inch injection tube, metered from two Teledyne ISCO Model 100DM Syringe Pumps (single pump, 103 ml capacity, 25 ml/min maximum flow, 0.00001 ml/min minimum flow) with Teledyne ISCO Series D Pump Controllers.

Example 5, a process for modifying a polymer flow index, was performed as Example 4 with the change that the 2,4-hexadiene diluted in hexane was utilized at a reactor concentration of 2.78 ppm 2,4-hexadiene based upon the ethylene feed.

For Comparative Examples A-B: concentration of carbon dioxide; reactor temperature; $H_2/C_2$ mole ratio; $C_6/C_2$ mole ratio; and residence time are shown in Table 1. For Examples 1-5: concentration of carbon dioxide, carbon monoxide, and 2,4-hexadiene; reactor temperature; $H_2/C_2$ mole ratio; $C_6/C_2$ mole ratio; and residence time are shown in Table 2

TABLE 1

| | Reactor Temperature (° C.) | $H_2/C_2$ mole ratio | $C_6/C_2$ mole ratio | Residence time (hrs) | Concentration (ppmv based on ethylene feed) |
|---|---|---|---|---|---|
| Comparative Example A | 108 | 0.15 | 0.036 | 2.3 | 0.00 |
| Comparative Example B | 108 | 0.15 | 0.036 | 2.3 | 0.20 (Carbon Dioxide) |

TABLE 2

| | Reactor Temperature (° C.) | $H_2/C_2$ mole ratio | $C_6/C_2$ mole ratio | Residence time (hrs) | Concentration (ppmv based on ethylene feed) |
|---|---|---|---|---|---|
| Example 1 | 108 | 0.15 | 0.036 | 2.3 | 25.00 (Carbon Dioxide) |
| Example 2 | 108 | 0.15 | 0.036 | 2.3 | 0.20 (Carbon Monoxide) |
| Example 3 | 108 | 0.15 | 0.036 | 2.3 | 0.51 (Carbon Monoxide) |
| Example 4 | 108 | 0.15 | 0.036 | 2.3 | 0.69 (2,4-hexadiene) |
| Example 5 | 108 | 0.15 | 0.036 | 2.3 | 2.78 (2,4-hexadiene) |

For Comparative Examples A-B and for Examples 1-5: polymer flow index was determined based on ASTM D1238-F run at 190° C., with 21.6 kg weight having the standard designation for that measurement of 190/21.60;

fluidized bulk density in the reactor was determined by measuring a difference in pressure across a known height of the fluidized bed; density was determined in accordance with ASTM D-792; catalyst productivity was determined by ICPES (Inductively Coupled Plasma Emission Spectroscopy based on the chromium in the catalyst and the chromium in the polymer particles; and average particle size was determined by a GRADEX™ G203-SP1. The results are shown in Table 3 and Table 4, respectively.

TABLE 3

|  | Polymer Flow Index (dg/min) | Fluidized Bulk Density (kg/m³) | Density (g/cm³) | Catalyst productivity (kg/kg) | Average particle size (mm) |
| --- | --- | --- | --- | --- | --- |
| Comparative Example A | 7.50 | 252 | 0.9475 | 9639 | 0.97 |
| Comparative Example B | 7.51 | 256 | 0.9471 | 9257 | 0.94 |

TABLE 4

|  | Polymer Flow Index (dg/min) | Fluidized Bulk Density (kg/m³) | Density (g/cm³) | Catalyst productivity (kg/kg) | Average particle size (mm) |
| --- | --- | --- | --- | --- | --- |
| Example 1 | 5.16 | 260 | 0.9444 | 7857 | 1.02 |
| Example 2 | 6.88 | 266 | 0.9453 | 3962 | 1.00 |
| Example 3 | 6.51 | 270 | 0.9447 | 3596 | 0.82 |
| Example 4 | 11.0 | 228 | 0.9491 | 8738 | 0.89 |
| Example 5 | 8.80 | 242 | 0.9475 | 7664 | 0.98 |

The data in Tables 3 and 4 show that utilizing an active amount of the flow index modifier with the chromium catalyst modifies the polymer flow index of the polymer being formed. For instance, utilizing an active amount of carbon dioxide for Example 1 decreased the polymer flow index by approximately 30%, as compared to Comparative Example A and Comparative Example B; utilizing an active amount of carbon monoxide for Example 2 and Example 3 decreased the polymer flow index by approximately 8% and 13%, as compared to Comparative Example A; and utilizing an active amount of 2,4-hexadiene for Example 4 and Example 5 respectively increased the polymer flow index by approximately 47% and 17%, as compared to Comparative Example A. Further, FIG. 2 for carbon dioxide, FIG. 4 for carbon monoxide, and FIG. 6 for 2,4-hexadiene, respectively illustrate that utilizing an active amount of the flow index modifier with the chromium catalyst modifies the polymer flow index of the polymer being formed. FIGS. 2 and 4 illustrate that the polymer flow index is decreased for utilizing an active amount of carbon dioxide and carbon monoxide, respectively. FIG. 6 further illustrates that utilizing an active amount of 2,4-hexadiene, the polymer flow index values can pass through a maximum value located near the concentration of 2,4-hexadiene of Example 4, and that increasing the 2,4-hexadiene concentration therefrom, e.g., to the active amount of 2,4-hexadiene of Example 5, can cause the polymer flow index to decrease relative to its highest level at the maximum value observed.

Additionally, the data in Tables 3 and 4 show that utilizing an active amount of the flow index modifier with the chromium catalyst modifies the density of the polymer being formed. For instance, utilizing an active amount of carbon dioxide for Example 1 decreased the density by approximately 0.003.1 g/cm³ as compared to Comparative Example A and 0.0027 g/cm³ as compared to Comparative Example B; utilizing an active amount of carbon monoxide for Example 2 and Example 3 respectively decreased the density by approximately 0.0022 g/cm³ and 0.0028 g/cm³ as compared to Comparative Example A; and utilizing an active amount of 2,4-hexadiene for Example 4 and Example 5 respectively increased the density by approximately 0.0016 g/cm³ and 0.0004 g/cm³, as compared to Comparative Example A. Further, FIG. 3 for carbon dioxide, FIG. 5 for carbon monoxide, and FIG. 7 for 2,4-hexadiene, respectively illustrate that utilizing an active amount of the flow index modifier with the chromium catalyst modifies the density of the polymer being formed. FIGS. 3 and 5 illustrate that the polymer density is decreased for utilizing an active amount of carbon dioxide and carbon monoxide. FIG. 7 further illustrates that utilizing an active amount of 2,4-hexadiene modifier, the density can pass through a maximum value located near the concentration of 2,4-hexadiene of Example 4, and that increasing the 2,4-hexadiene concentration therefrom, e.g., to the active amount of 2,4-hexadiene of Example 5, can cause the polymer density to decrease relative to its highest level at the maximum value observed.

Additionally, the data in Tables 3 and 4 show that utilizing an active amount of the flow index modifier with the chromium catalyst modifies the fluidized bulk density of the polymer being formed. For instance, utilizing an active amount of carbon dioxide for Example 1 increased the fluidized bulk density by 3%, as compared to Comparative Example B; utilizing an active amount of carbon monoxide for Example 2 and Example 3 respectively increased the fluidized bulk density by approximately 5.5% and 6.7%, as compared to Comparative Example A; and utilizing an active amount of 2,4-hexadiene for Example 4 and Example 5 respectively decreased the fluidized bulk density by approximately 10% and 4%, as compared to Comparative Example A. Further, FIG. 3 for carbon dioxide, FIG. 5 for carbon monoxide, and FIG. 7 for 2,4-hexadiene, respectively illustrate that utilizing an active amount of the flow index modifier with the chromium catalyst modifies the fluidized bulk density of the polymer being formed. FIGS. 3 and 5 illustrate that the fluidized bulk density is increased for carbon dioxide and carbon monoxide. FIG. 7 further illustrates that for 2,4-hexadiene, the fluidized bulk density can pass through a minimum value located near the concentration of 2,4-hexadiene of Example 4, and that increasing the 2,4-hexadiene concentration therefrom, e.g., to the active amount of 2,4-hexadiene of Example 5, can cause causes the polymer fluidized bulk density to increase relative to its lowest level at the minimum value observed.

Additionally, FIG. 2 for carbon dioxide, FIG. 4 for carbon monoxide, and FIG. 6 for,4-hexadiene, respectively illustrate that utilizing an active amount of the flow index modifier with the chromium catalyst can reduce the catalyst productivity, i.e., productivity kg/kg.

What is claimed:

1. A method for modifying a polymer flow index, comprising:
  providing monomers to a polymerization reactor;
  providing a chromium catalyst to the polymerization reactor; and
  providing an active amount of a flow index modifier to the polymerization reactor, wherein the flow index modifier is carbon monoxide and is from 0.010 parts per million to 2.000 parts per million based upon the monomers, wherein providing the active amount of the flow index modifier to the polymerization reactor forms a polymer having a polymer flow index that is reduced as compared to a second polymer having a different polymer flow index, where the second polymer is formed by a same polymerization process, but without utilizing an active amount of the flow index modifier.

2. The method of claim 1, wherein, the polymer flow index is reduced from about 5% to about 50% as compared to the second polymer.

3. The method of claim 1, wherein the monomers comprise ethylene.

4. The method of claim 1, comprising forming polyethylene.

5. The method of claim 1, wherein the chromium catalyst is a reduced chromium oxide catalyst.

6. A method for modifying a polymer flow index, comprising:

providing monomers to a polymerization reactor;

providing a chromium catalyst to the polymerization reactor; and providing an active amount of a flow index modifier to the polymerization reactor, wherein the flow index modifier is 2,4-hexadiene and is from 0.05 parts per million to 5.00 parts per million based upon the monomers.

7. The method of claim 6, wherein, providing the active amount of the flow index modifier to the polymerization reactor forms a polymer having a polymer flow index that increased as compared to a second polymer having a different polymer flow index, where the second polymer is formed by a same polymerization process, but without utilizing an active amount of the flow index modifier.

8. The method of claim 7, wherein, the polymer flow index is increased from about 50% to about 250% as compared to the second polymer.

9. The method of claim 8, wherein, the polymer flow index has a maximum value relative to a first active amount and a second active amount of the 2,4-hexadiene.

\* \* \* \* \*